O. E. JABLON.
LOCKING DEVICE.
APPLICATION FILED NOV. 22, 1920.
1,400,487.
Patented Dec. 13, 1921.
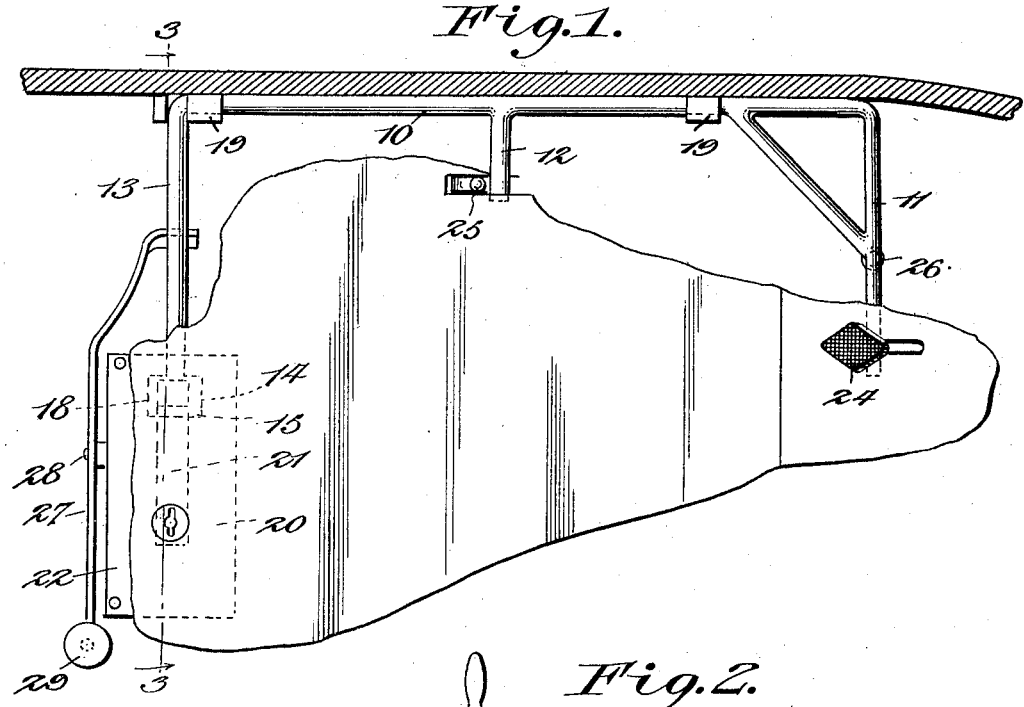
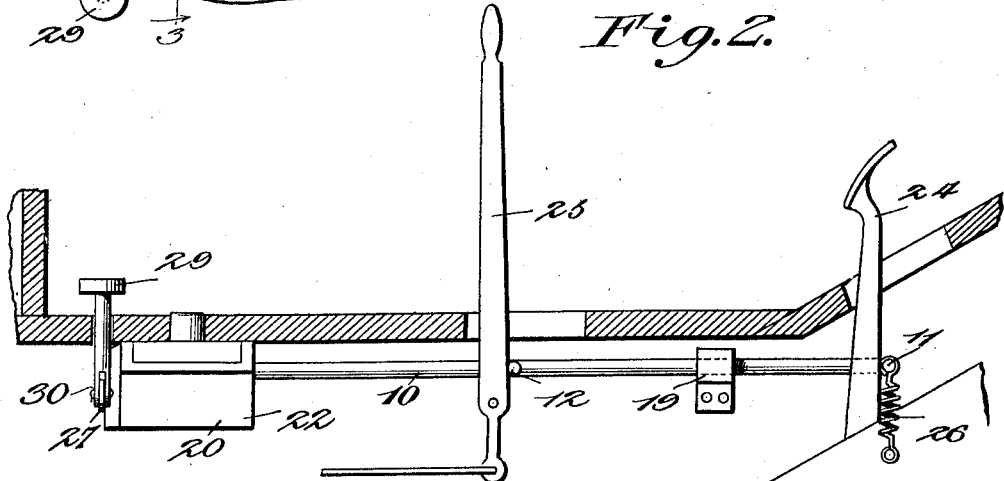
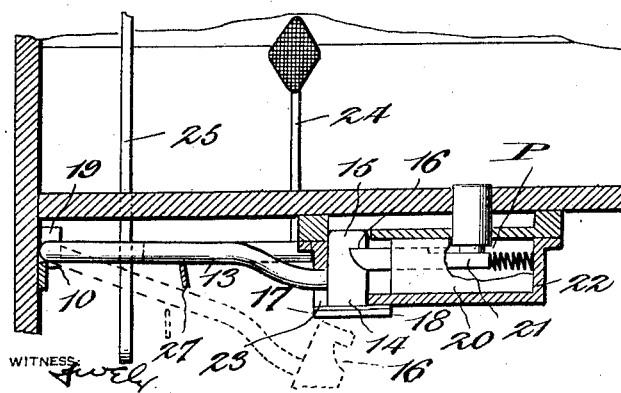
Oscar E. Jablon, INVENTOR
BY Victor J. Evans
ATTORNEY

UNITED STATES PATENT OFFICE.

OSCAR E. JABLON, OF PLAINFIELD, NEW JERSEY.

LOCKING DEVICE.

1,400,487.   Specification of Letters Patent.   Patented Dec. 13, 1921.

Application filed November 22, 1920. Serial No. 425,813.

*To all whom it may concern:*

Be it known that I, OSCAR E. JABLON, a citizen of the United States, residing at Plainfield, in the county of Union and State of New Jersey, have invented new and useful Improvements in Locking Devices, of which the following is a specification.

This invention relates to locking devices.

More particularly, the invention relates to locking devices for use upon automobiles for locking motor control parts such as the clutch lever and the brake lever.

Some of the objects of the present invention are: to simplify devices of the character mentioned; to produce a device which is more reliable in use and one which is comparatively inexpensive. With these and other objects in view, the invention resides in the particular provision and relative arrangement of parts more fully described in the following specification and illustrated in the accompanying drawing, in which:

Figure 1 is a plan view illustrating the application of the present invention to use.

Fig. 2 is a vertical sectional elevation.

Fig. 3 is a sectional view taken on the line 3—3, Fig. 1.

Referring now to the drawing for details it will be manifest that, the device will include a rocker member 10, which is provided with extensions or parts 11 and 12, and a part 13, whose free end is enlarged as at 14 to add weight to said part 13. The enlargement 14 consists of a part 15 having a notch 16 therein, and a part 17 which provides marginal portions 18. The member 10 is mounted for its rocking movement in bearings 19 which may be secured to some suitable part of the vehicle with which the device is used. The said member 10 is preferably arranged beneath the floor of the dash of the vehicle.

Locking means 20 which may be of any preferred kind are employed to hold the rocker member 10 locked against movement. The said means 20 essentially includes a key actuated spring pressed bolt 21 which automatically springs into the notch 16 in one position of the part 13; the said bolt is adapted to be withdrawn from the said notch by employing a key. The said means 20 also includes a housing 22 which is securely bolted in place over the lock proper P to inclose the same. The housing 22 is provided with an opening 23 at a point therein adjacent the free projecting end of the bolt 21. The part 15 is adapted to enter the opening 23 and snugly fits within the same. The marginal portions 18 surround the edges of the opening 23 to prevent the insertion of any tool to push back the bolt 21.

When the rocker member 10 is held locked against movement with the end of the bolt 21 projected into the notch 16, the extension 11, in accordance with the present invention, will be disposed in front of a motor control part or clutch lever 24, and the part 12 will be disposed in front of the brake lever 25. Under such arrangement of the parts it would be impossible to start the vehicle unless the locking means were first operated.

When the bolt 21 is withdrawn from the notch 16 the member 10 will be rocked in its bearings and as a consequence the extensions 11 and 12 will be moved out of the way of the levers 24 and 25. The movement of the member 10 is automatic due to the fact that a spring 26 exerts a pull on the part 11 aside from the influence of the added weight of the enlargement 14 of the part 13 which moves by gravity.

In order that the extensions or parts 11 and 12 may be returned to positions in which they obstruct their respective levers 24 and 25, there is provided a lever 27 which is pivoted as at 28 to the housing 22. One end of the lever 27 engages the part 13, and a foot piece 29 is connected to the other end of the said lever as at 30. The foot piece is disposed above the floor of the dash of the vehicle so as to be readily accessible and capable of being pressed downwardly. By pressing or pushing the foot piece 29 downwardly, and in virtue of the intervention of the lever 27, the part 13 may be raised to such position that the end of the bolt 21 may spring automatically into the notch 16 and thereby lock the member 10 against movement.

From the foregoing it will be manifest that, unless an individual possesses the right key he or she will be unable to remove the extensions 11 and 12 from their obstructing positions and as a consequence will be unable to start the vehicle equipped with this device.

What is claimed is:

1. In a locking device as characterized, a movable member, obstructing extensions movable with said member, and key controlled means including an automatically operable bolt and a notched part on said member with which said bolt coacts for locking said member against movement, the said means being operable to permit the movement of said member to move said extensions to non-obstructing positions.

2. In a locking device, a movable member, extensions movable with said member, key controlled means for locking said member against movement with the said extensions in obstructing positions, the said means being operable to permit the movement of said member and the extensions to non-obstructing positions, and a lever engageable with said member and operable to move said member to move said extensions to obstructing positions.

3. In a locking device, a movable member, extensions movable with said member, key controlled means for locking said member against movement with the said extensions in obstructing positions, the said means being operable to permit the movement of said member and the extensions to non-obstructing positions, means for automatically effecting the movement of said member, and a lever engageable with said member and operable to move said member to move said extensions to obstructing positions.

4. In a locking device, a movable member, obstructing extensions secured to said member, a part secured to said member, an enlargement on said part, a notch and marginal portions embodied by said enlargement, a lock including a spring pressed bolt, a housing inclosing said lock, the said housing having an opening therein adjacent the end of said bolt, the said bolt being operable to be moved into and out of engagement with the said notch and the said marginal portions adapted to surround the edges of said opening when the end of said bolt is in the said notch.

In testimony whereof I hereby affix my signature.

OSCAR E. JABLON.